United States Patent
Matsubara et al.

(10) Patent No.: US 8,777,812 B2
(45) Date of Patent: Jul. 15, 2014

(54) CONTROL APPARATUS AND CONTROL METHOD FOR VEHICULAR AUTOMATIC TRANSMISSION

(71) Applicants: Tooru Matsubara, Toyota (JP); Atsushi Tabata, Okazaki (JP); Masakazu Kaifuku, Okazaki (JP); Yoshiki Ando, Nishio (JP)

(72) Inventors: Tooru Matsubara, Toyota (JP); Atsushi Tabata, Okazaki (JP); Masakazu Kaifuku, Okazaki (JP); Yoshiki Ando, Nishio (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 114 days.

(21) Appl. No.: 13/651,641

(22) Filed: Oct. 15, 2012

(65) Prior Publication Data
US 2013/0109533 A1    May 2, 2013

(30) Foreign Application Priority Data
Oct. 27, 2011   (JP) .................................. 2011-236530

(51) Int. Cl.
*F16H 61/00* (2006.01)

(52) U.S. Cl.
USPC .......................................................... 477/148

(58) Field of Classification Search
USPC ................... 477/132, 139, 148, 149
See application file for complete search history.

(56) References Cited

U.S. PATENT DOCUMENTS

| | | | | |
|---|---|---|---|---|
| 5,029,494 A | * | 7/1991 | Lentz et al. .................. | 477/148 |
| 5,036,729 A | * | 8/1991 | Nitz et al. .................... | 477/148 |
| 7,563,198 B2 | * | 7/2009 | Ayabe et al. ................. | 477/132 |
| 7,680,575 B2 | * | 3/2010 | Han et al. ....................... | 701/51 |
| 8,165,766 B2 | * | 4/2012 | Muller et al. .................. | 701/66 |
| 8,430,791 B2 | * | 4/2013 | Ito et al. ............................. | 477/5 |
| 2011/0312468 A1 | | 12/2011 | Ito et al. | |
| 2013/0046450 A1 | * | 2/2013 | Gentile et al. ................ | 701/56 |

FOREIGN PATENT DOCUMENTS

| | | |
|---|---|---|
| JP | A-8-296732 | 11/1996 |
| JP | A-2002-295663 | 10/2002 |
| JP | A-2010-190372 | 9/2010 |
| JP | A-2010-216589 | 9/2010 |

* cited by examiner

*Primary Examiner* — Dirk Wright
(74) *Attorney, Agent, or Firm* — Oliff PLC

(57) ABSTRACT

In a downshift of an automatic transmission in a state where an accelerator pedal is depressed, one of a clutch-to-clutch shift in which the shift is carried out by gradually reducing an engagement pressure of a clutch or a brake to be disengaged in the shift and a rotation synchronization shift in which the shift is carried out by reducing the engagement pressure of the clutch or the brake more quickly than in the clutch-to-clutch shift is selected based on an output shaft torque of the automatic transmission, a region where the rotation synchronization shift is selected is lower in output shaft torque than a region where the clutch-to-clutch shift is selected, and hence it is possible to appropriately selectively execute a shift placing emphasis on a shock and a shift placing emphasis on a shift speed in accordance with the output shaft torque.

10 Claims, 6 Drawing Sheets

|  | C1 | C2 | B1 | B2 | F1 | SPEED RATIO |
|---|---|---|---|---|---|---|
| 1ST | O |  |  | (O) | O | 3.20 |
| 2ND | O |  | O |  |  | 1.72 |
| 3RD | O | O |  |  |  | 1.00 |
| 4TH |  | O | O |  |  | 0.67 |
| R | O |  |  | O |  | 3.20 |
| N |  |  |  |  |  |  |

O: ENGAGEMENT

CONTROL APPARATUS AND CONTROL METHOD FOR VEHICULAR AUTOMATIC TRANSMISSION

INCORPORATION BY REFERENCE

The disclosure of Japanese Patent Application No. 2011-236530 filed on Oct. 27, 2011 including the specification, drawings and abstract is incorporated herein by reference in its entirety.

BACKGROUND OF THE INVENTION

1. Field of the Invention

The invention relates to a control apparatus and a control method for a stepped vehicular automatic transmission, and particularly relates to an improvement for preventing the occurrence of a shock while improving shift response.

2. Description of Related Art

A stepped automatic transmission that selectively establishes a plurality of gears based on the running state of a vehicle from a predetermined shift diagram is widely used in various vehicles. In the automatic transmission described above, there is proposed a technology in which a plurality of types of shifts are selectively executed in accordance with the depression amount of an accelerator pedal. For example, a shift control apparatus for an automatic transmission described in Japanese Patent Application Publication No. 2002-295663 (JP-2002-295663 A) corresponds to the technology. According to this technology, when the depression speed of the accelerator pedal is relatively high, it is determined that the shift is the one placing emphasis on a shift speed, and the hydraulic pressure of an engagement device is reduced relatively quickly and the swift shift is performed, while when the depression speed of the accelerator pedal is relatively low, it is determined that the shift is the one placing emphasis on a shock and control in which the gradient of the hydraulic pressure of the engagement device is made gentle is performed, whereby it is possible to achieve shift feeling in response to the will of a driver.

However, in the related art described above, for example, when the shift placing emphasis on the shift speed is performed, there has been a problem that a reduction in output shaft torque is increased by quickly disengaging a disengagement-side engagement device to be disengaged in the shift. In particular, when a vehicle is running with a relatively large drive force, there has been a possibility that such reduction in output shaft torque leads to a redaction in drivability. This problem has been found out in the course of elaborate studies conducted by the inventors for the purpose of achieving both of excellent shift response and drivability in shift control of the automatic transmission.

SUMMARY OF THE INVENTION

The invention has been achieved with the above-described circumstances as a background, and the invention provides a control apparatus and a control method for a vehicular automatic transmission that prevents the occurrence of a shock while improving shift response.

According to one aspect of the invention, there is provided a control apparatus for a vehicular automatic transmission provided with a controller having the following features. The controller is configured to selectively execute one of a clutch-to-clutch shift and a rotation synchronization shift based on an output shaft torque of the automatic transmission in a downshift of the automatic transmission in a state where an accelerator pedal is depressed. Herein, a region where the rotation synchronization shift is selected is lower in output shaft torque than a region where the clutch-to-clutch shift is selected. In addition, the vehicular automatic transmission is a stepped automatic transmission that is connected to a drive force source and establishes any of a plurality of predetermined gears by selectively engaging a plurality of engagement devices.

According to the above-described control apparatus, in the downshift of the automatic transmission is the state where the accelerator pedal is depressed, one of the clutch-to-clutch shift and the rotation synchronization shift is selectively executed based on the output shaft torque of the automatic transmission, the region where the rotation synchronization shift is selected is lower in output shaft torque than the region where the clutch-to-clutch shift is selected, and hence it is possible to selectively execute the shift placing emphasis on a shock or the shift placing emphasis on a shift speed in accordance with the output shaft torque. That is, it is possible to provide the control apparatus for a vehicular automatic transmission that prevents the occurrence of the shock while improving shift response.

In addition, the clutch-to-clutch shift may be a shift in which the shift is carried out by gradually reducing an engagement pressure of the engagement device to be disengaged in the shift, and the rotation synchronization shift may be a shift in which an engagement pressure of the engagement device to be disengaged in the shift is reduced more quickly than in the clutch-to-clutch shift. With this arrangement, it is possible to selectively execute the shift placing emphasis on the shock or the shift placing emphasis on the shift speed in accordance with the output shaft torque.

Further, the control apparatus may select the clutch-to-clutch shift when the output shaft torque of the automatic transmission is not less than a predetermined threshold, select the rotation synchronization shift when the output shaft torque of the automatic transmission is less than the threshold, and change the threshold based on at least one of a vehicle speed, an accelerator depression amount, and a gear established in the automatic transmission. According to the above-described control apparatus, when the output shaft torque is relatively large, it is possible to prevent a reduction in drive force by performing shift control based on engagement pressure control of the engagement device and, when the output shaft torque is relatively small, it is possible to swiftly perform the shift by performing shift control based on rotation speed control of the drive force source. Furthermore, it is possible to further adequately select the shift placing emphasis on the shock or the shift placing emphasis on the shift speed by changing the threshold based on the vehicle speed, the accelerator depression amount, and the gear.

Herein, the threshold may be set to a larger value as the vehicle speed is higher, the threshold may be set to a larger value as a temporal change rate of the accelerator depression amount is larger, and the threshold may be set to a larger value as the gear of the automatic transmission is a lower gear.

A drive force change amount between the value before the shift and the value after the shift is larger as the vehicle speed is higher so that a shock due to a torque reduction is canceled out by a larger shock resulting from the large drive force change amount and the sensitivity of a driver to the shock is thereby lowered. Consequently, according to the above-described control apparatus, the region where the rotation synchronization shift is selected is enlarged, and hence it is possible to execute the shift control that places emphasis on the shift response while suppressing the shock to the driver caused by the shift as much as possible. In addition, the drive force change amount between the value before the shift and the value after the shift is larger as the temporal change rate of the accelerator depression amount is larger so that the shock due to the torque reduction is canceled out by the larger shock resulting from the large drive force change amount and the sensitivity of the driver to the shock is thereby lowered. Consequently, according to the above-described control apparatus, the region where the rotation synchronization shift is selected is enlarged, and hence it is possible to execute the shift control that places emphasis on the shift response while suppressing the shock to the driver caused by the shift as much as possible. Further, the drive force change amount between the value before the shift and the value after the shift is larger as the gear is a lower gear so that the shock due to the torque reduction is canceled out by the larger shock resulting from the large drive force change amount and the sensitivity of the driver to the shock is thereby lowered. Consequently, according to the above-described control apparatus, the region where the rotation synchronization shift is selected is enlarged, and hence it is possible to execute the shift control that places emphasis on the shift response while suppressing the shock to the driver caused by the shift as much as possible.

Furthermore, in a case where the downshift is a multiple shift, when the rotation synchronization shift is selected in a prior shift, the control apparatus may select the rotation synchronization shift also in a subsequent shift. According to the above-described control apparatus, it is possible to farther improve the shift response by quickly establishing the target gear when the engagement pressure of a disengagement-side engagement device is reduced.

Moreover, in the case where the downshift is the multiple shift, when the clutch-to-clutch shift is selected in the prior shift, the control apparatus may select one of the clutch-to-clutch shift and the rotation synchronization shift in the subsequent sift based on the output shaft torque of the automatic transmission. According to the above-described control apparatus, it is possible to selectively execute, as the subsequent shift in the multiple shift, one of the shift placing emphasis on the shock and the shift placing emphasis on the shift speed in accordance with the output shaft torque.

Additionally, in the case where the downshift is the multiple shift, the control apparatus may select the clutch-to-clutch shift in the subsequent shift when the output shaft torque of the automatic transmission is not less than a predetermined threshold, and select the rotation synchronization shift in the subsequent shift when the output shaft torque of the automatic transmission is less than the threshold. According to the above-described control apparatus, in the case where the downshift is the multiple shift, when the output shaft torque is relatively large, it is possible to reduce the shift shock by performing the shift control placing emphasis on the shift shock and, when the output shaft torque is relatively small, it is possible to swiftly perform the shift by performing the shift control placing emphasis on the shift speed.

According to another aspect of the invention, mere is provided a control method for a vehicular automatic transmission having the following features. In the control method, one of a clutch-to-clutch shift and a rotation synchronization shift is selectively executed based on an output shaft torque of the automatic transmission in a downshift of the automatic transmission in a state where an accelerator pedal is depressed, a region where the rotation synchronization shift is selected is lower in output shaft torque than a region where the clutch-to-clutch shift is selected, and the vehicular automatic transmission is a stepped automatic transmission that is connected to a drive force source and establishes any of a plurality of predetermined gears by selectively engaging a plurality of engagement devices.

According to the above-described control method, in the downshift of the automatic transmission in the state where the accelerator pedal is depressed, one of the clutch-to-clutch shift and the rotation synchronization shift is selectively executed based on the output shaft torque of the automatic transmission, the region where the rotation synchronization shift is selected is lower in output shaft torque than the region where the clutch-to-clutch shift is selected, and hence it is possible to selectively execute the shift placing emphasis on the shock and the shift placing emphasis on the shift speed in accordance with the output shaft torque. That is, it is possible to provide the control method for a vehicular automatic transmission that prevents the occurrence of the shock while improving the shift response.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figures 1, 2:
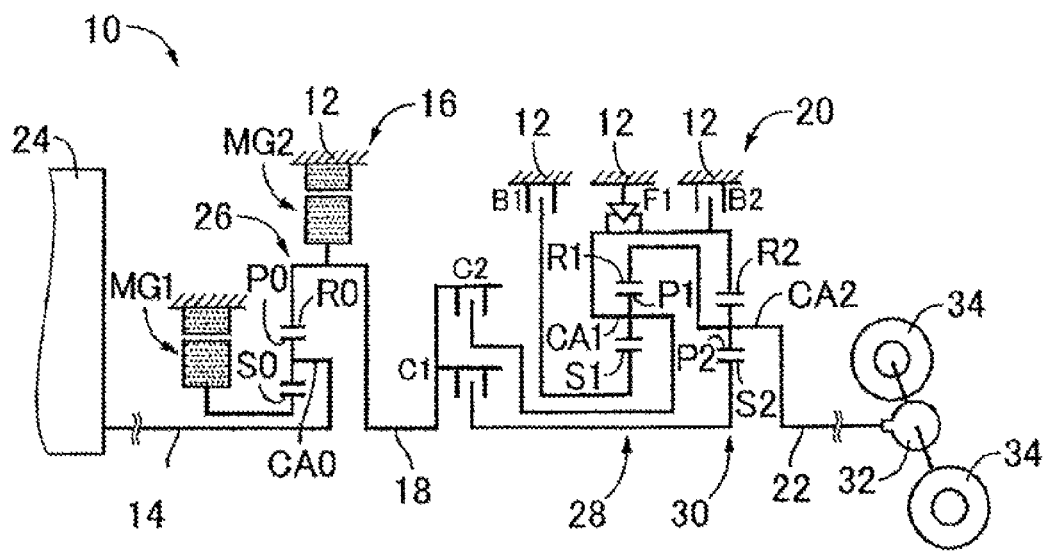
FIG. 1 is a schematic illustration for explaining a drive device of a vehicle provided with a vehicular automatic transmission applied to an embodiment as one example of the invention.
FIG. 2 is an operation chart for explaining combinations of operations of hydraulic frictional engagement devices used in a shift operation of the automatic transmission of FIG. 1.

The invention is applied to, e.g., shift control of an automatic transmission in a hybrid vehicle. The hybrid vehicle includes an electric differential portion having a motor functioning as a drive force source, and the automatic transmission is connected to the electric differential portion. The electric differential portion may include a differential system having a first rotary element, a second rotary element that is an input rotary member and is connected to an engine, and a third rotary element that is an output rotary member, a first motor that is connected to the first rotary element, and a second motor that is connected to a power transmission path from the third rotary element to drive wheels so as to be able to transmit power. The second motor may be connected to the output rotary member of the electric differential portion, and the output rotary member may be connected to an input shaft of the automatic transmission. In a rotation synchronization shift, shift control in such a mode may be realized by controlling the torque of the second motor.

In the configuration in which an output shaft torque of the automatic transmission is uniquely determined based on an input shaft torque of the automatic transmission, the input shaft torque may be used as a reference of selection of the mode of the shift control. That is, one of a clutch-to-clutch shift and the rotation synchronization shift may be selected based on the input shaft torque of the automatic transmission.

The rotation synchronization shift may have a shift mode in which the shift is carried out by reducing the engagement pressure of an engagement device to be disengaged in the shift more quickly than in the the clutch-to-clutch shift and changing the rotational speed of a drive force source. The rotation synchronization shift may have a shift mode in which the shift is carried out by reducing the engaging torque of the engagement device to be disengaged in the shift to zero at the time of output of the shift and changing the rotational speed of the drive force source. The rotation synchronization shift may have a shift mode in which the shift is carried out by reducing the engaging torque of the engagement device to be disengaged in the shift to zero as quickly as possible and changing the rotational speed of the drive force source.

The clutch-to-clutch shift may have a shift mode in which the shift is carried out in a state where any of the disengagement-side engagement device and the engagement-side engagement device is engaged (or half-engaged) during a period from the start to the end of the shift. The rotation synchronization shift has a shift mode in which a period when both of the disengagement-side engagement device and the engagement-side engagement device are disengaged is present during the period from the start to the end of the shift. The clutch-to-clutch shift may have a shift mode in which the rotational speed related to the shift is increased by the engaging torque of the engagement device to be engaged in the shift. Further, the rotation synchronization shift has a shift mode in which the ratio of the increase in the rotational speed related to the shift by the engaging torque of the engagement device to he engaged in the shift (the ratio to the entire increase amount of the rotational speed) is smaller than that in the clutch-to-clutch shift.

In the rotation synchronization shift, the control of the rotation speed related to the shift may be performed by quickly reducing the hydraulic pressure (engagement pressure) of the disengagement-side engagement device, i.e., the engagement device to be disengaged in the shift to a predetermined value (preferably zero), maintaining the torque of the drive force source for a predetermined time, and then changing the torque of the drive force source.

In a case where a power-on downshift is performed by means of the rotation synchronization shift, when the engagement-side engagement device, i.e., the engagement device to be engaged in the shift is an engagement device that needs hydraulic control for the engagement such as a hydraulic frictional engagement device, control in which an input rotation speed of the automatic transmission is temporarily increased to be higher than a synchronization rotation speed at the end of the shift may be performed. That is, a target input rotation speed may be set to a value larger than the synchronization rotation speed.

In the case where the power-on downshift is performed by means of the rotation synchronization shift, when the engagement-side engagement device, i.e., the engagement device to be engaged in the shift is an engagement device that can be engaged without the hydraulic control such as a one-way clutch, control in which the input rotation speed of the automatic transmission is temporarily reduced to be lower than the synchronization rotation speed at the end of the shift may be performed. That is, the target input rotation speed may be set to a value smaller than the synchronization rotation speed.

Hereinbelow, the embodiment of the invention is described in detail with reference to the drawings.

FIG. 1 is a schematic illustration for explaining a drive device 10 of a vehicle provided with a vehicular automatic transmission 20 applied to the invention. The drive device 10 shown in FIG. 1 is suitably used in a front-engine rear-drive (FR) vehicle or the like, and includes, in series, an input shaft 14, a differential portion 16 directly connected to the input shaft 14 or indirectly connected thereto via a pulsation absorbing damper (vibration damping device) that is not shown, an automatic transmission 20 connected in series to the power transmission path between the differential portion 16 and a pair of drive wheels 34 via a transmitting member (drive shaft) 18, and an output shaft 22 connected to the automatic transmission 20 that are disposed on the common shaft in a transmission case 12 (hereinafter referred to as a case 12) as a non-rotary member attached to a body.

The drive device 10 includes an engine 24 that is an internal combustion engine such as, e.g., a gasoline engine or a diesel engine as a drive force source for running directly connected to the input shaft 14 or indirectly connected thereto via the pulsation absorbing damper (not shown), and is a power transmission device that is provided in the power transmission path between the engine 24 and the pair of drive wheels 34 and transmits power generated by the engine 24 to the pair of drive wheels 34 via a differential gear device 32 or the like. In the drive device 10 of the present embodiment, the engine 24 is directly connected to the differential portion 16. The connection mentioned herein denotes that they are connected to each other without the intervention of a fluid drive device such as a torque converter or a fluid coupling, and the connection via, e.g., the pulsation absorbing damper or the like is included in the connection. The above-described drive device 10 is configured so as to be symmetric with respect to its axis, and hence the lower portion thereof is omitted in the schematic illustration of FIG. 1.

The differential portion 16 includes a first motor MG1, a power distribution device 26 that functions as a mechanical mechanism for mechanically distributing the output of the engine 24 inputted to the input shaft 14 and also functions as a differential mechanism for distributing the output of the engine 24 to the first motor MG1 and the transmitting member 18, and a second motor MG2 that is operably connected to the transmitting member 18 so as to rotate integrally with the transmitting member 18. Each of the first and second motors MG1 and MG2 provided in the drive device 10 of the present embodiment may be a so-called motor generator that functions as a motor and a generator. The first motor MG1 has at least a generator (power generation) function for generating a reaction force, while the second motor MG2 has at least a motor function for outputting the drive force as the drive force source for running. With this configuration, the operation slate of the differential portion 16 is controlled via the first and second motors MG1 and MG2, and tire differential portion 16 thereby functions as an electric differential portion that controls the differential state of the input rotation speed (the rotation speed of the input shaft 14) and the output rotation speed (the rotation speed of the transmitting member 18).

The power distribution device 26 is configured to have a single-pinion planetary gear set as a main portion. The planetary gear set has, as rotary elements (elements), a sun gear S0, a planetary gear P0, a carrier CA0 that supports the planetary gear P0 such that the planetary gear P0 can rotate and revolve, and a ring gear R0 that gears with the sun gear S0 via the planetary gear P0. The carrier CA0 is connected to the input shaft 14, i.e., the engine 24, the sun gear S0 is connected to the first motor MG1, and the ring gear R0 is connected to the transmitting member 18. That is, in the power distribution device 26 as the differential mechanism, the sun gear S0 corresponds to a first rotary element, the carrier CA0 corresponds to a second rotary element, and the ring gear R0 corresponds to a third rotary element. In the power distribution device 26, the carrier CA0 functions as an input element, the sun gear S0 functions as a reaction force element, and the ring gear R0 functions as an output element.

In the power distribution device 26 configured in the above-described manner, the sun gear S0, the carrier CA0, and the ring gear R0 are adapted to be rotatable relative to each other and a differential state where the differential operation is operable, i.e., the differential function works is established so that the output of the engine 24 is distributed to the first motor MG1 and the transmitting member 18 and, with a part of the output of the engine 24, storage is performed using electric energy generated by the first motor MG1 and the second motor MG2 is rotationally driven. Consequently, the differential portion 16 (the power distribution device 26) is caused to function as an electric differential device to attain e.g., a so-called continuously variable transmission state (electrical CVT state), and the rotation of the transmitting member 18 can be continuously changed irrespective of the constant rotation of the engine 24. That is, the differential portion 16 functions as an electric continuously variable transmission in which a speed ratio $\gamma 0$ (a rotation speed $N_{IN}$ of the input shaft 14/a rotation speed $N_{18}$ of the transmitting member 18) is continuously changed from the minimum value $\gamma 0_{min}$ to the maximum value $\gamma 0_{max}$. Thus, by controlling the operation states of the first motor MG1, the second motor MG2, and the engine 24 that are connected to the power distribution device 26 (the differential portion 16) such that power can be transmitted to the power distribution device 26, the power distribution device 26 is caused to operate as the continuously variable transmission mechanism that controls the differential state of the rotation speed of the input shaft 14 and the rotation speed of the transmitting member 18 functioning as the output shaft of the differential portion 16.

In the drive device 10, an electric vehicle (EV) running state (EV mode) in which the engine 24 is stopped and at least one of the first motor MG1 and the second motor MG2 (preferably the second motor MG2) is used as the drive source for running, an engine running state (engine running mode) in which the engine 24 is driven to be used as the drive source for running and the first and second motors MG1 and MG 2 are brought into an idling or regenerative state, and a hybrid running state (hybrid mode) in which the engine 24 and the second motor MG2 are used as the drive source for running and regeneration is performed by the first motor MG1 on an as needed basis are selectively established.

The automatic transmission 20 is provided in the power transmission path between the engine 24 and the pair of drive wheels 34 in tandem with the power distribution device 26, and is a planetary-gear-type multiple-step transmission that establishes any of a plurality of predetermined gears by selectively engaging a plurality of engagement devices. The automatic transmission 20 is configured to have single-pinion planetary gear sets 28 and 30 as main portions. The planetary gear sets 28 and 30 have sun gears S1 and S2, planetary gears P1 and P2, carriers CA1 and CA2 that support the planetary gears P1 and P2 such that the planetary gears P1 and P2 can rotate and revolve, and ring gears R1 and R2 that gear with the sun gears S1 and S2 via the planetary gears P1 and P2.

The automatic transmission 20 includes, as the engagement devices mentioned above, a first clutch C1, a second clutch C2, a first brake B1, and a second brake B2 (hereinafter collectively referred to as clutches C and brakes B unless distinguished from each other). Each of the clutches C and the brakes B is a hydraulic fractional engagement device often used in a conventional vehicular automatic transmission as an engagement element. The hydraulic fictional engagement device is, e.g., a wet multi-plate type engagement device in which a plurality of plates stacked on each other are pressed by a hydraulic actuator, or the hydraulic frictional engagement device is composed of a band brake in which one end of one or two bands wound around the outer peripheral surface of a rotary drum is tightened by a hydraulic actuator, and selectively connects members between which the hydraulic fictional engagement device is disposed. To each of the clutches C and the brakes B, the hydraulic pressure adjusted by a hydraulic control circuit 40 (see FIG. 4 and the like) according to a hydraulic instruction value from an electronic control device 50 described later is supplied, and the engagement states of the clutches C and the brakes B are controlled in accordance with the hydraulic pressure.

In the automatic transmission 20, the sun gear S1 is selectively connected to the case 12 via the brake B1. The carrier CA1 and the ring gear R2 are integrally connected to each other and are selectively connected to the case 12 via the second brake B2, and the rotation thereof relative to the case 12 in one direction is allowed via a one-way clutch F1 as the engagement device and the rotation thereof relative to the case 12 in the reverse direction is prevented. The sun gear S2 is selectively connected to the transmitting member 18 via the first clutch C1. The carrier CA1 and the ring gear R2 that are integrally connected to each other are selectively connected to the transmitting member 18 via the second clutch C2. The ring gear R1 and the carrier CA2 are integrally connected to each other, and are connected to the output shaft 22.

FIG. 2 is an operation chart for explaining combinations of operations of the hydraulic frictional engagement devices used in the shift operation of the automatic transmission 20. As shown in FIG. 2, in the automatic transmission 20, the engagement of each of the first clutch C1 and the second brake B2 establishes the first gear having the maximum value of a speed ratio $\gamma 1$ of, e.g., about "3.20". Herein, when the downshift from the second gear to the first gear is performed, since the rotation of the carrier CA1 and the ring gear R2 relative to the case 12 is prevented by the one-way clutch F1, the second brake B2 does not need to be engaged. The engagement of each of the first clutch C1 and the first brake B1 establishes the second gear having a speed ratio $\gamma 2$ of a value smaller than that of the first gear such as, e.g., about "1.72". The engagement of each of the first clutch C1 and the second clutch C2 establishes the third gear having a speed ratio γ3 of a value smaller than that of the second gear such as, e.g., about "1.00". The engagement of each of the second clutch C2 and She first brake B1 establishes the fourth gear having a speed ratio γ4 of a value smaller than that of the third gear such as, e.g., about "0.67". The engagement of each of the first clutch C1 and the second brake B2 establishes a reverse gear having a speed ratio γR of, e.g., about "3.20". A neutral "N" state is established by disengaging the first clutch C1, the second clutch C2, the first-brake B1, and the second brake B2.

In the drive device 10 of the present embodiment configured in the above-described manner, the continuously variable transmission is composed of the differential portion 16 functioning as the continuously variable transmission and the automatic transmission 20 connected to the differential portion 16 together. By controlling the differential portion 16 such that the differential portion 16 has the constant speed ratio, the differential portion 16 and the automatic transmission 20 can attain the state equal to that of the stepped transmission. Specifically, the differential portion 16 functions as the continuously variable transmission and the automatic transmission 20 connected in tandem to the differential portion 16 functions as the stepped transmission, whereby the rotation speed inputted to the automatic transmission 20 (hereinafter referred to as an input rotation speed of the automatic transmission 20), i.e., the rotation speed of the transmitting member 18 (hereinafter referred to as a transmitting member rotation speed $N_{18}$) is steplessly changed at at least one gear M of the automatic transmission 20, and a stepless speed ratio width at tire gear M can be obtained. Consequently, a total speed ratio γT of the drive device 10 (=a rotation speed $N_{IN}$ of the input shaft 14/a rotation speed $N_{OUT}$ of the output shaft 22) can be steplessly obtained, and the continuously variable transmission is thus configured in the drive device 10. The total speed ratio γT of the drive device 10 is the total speed ratio γT as the entire drive device 10 determined based on the speed ratio γ0 of the differential portion 16 and the speed ratio γ of the automatic transmission 20.

For example, by the operation of the differential portion 16 as the continuously variable transmission, the rotation speed $N_{18}$ of the transmitting member 18 is steplessly changed at each of the first to fourth gears and the reverse gear of the automatic transmission 20 shown in the engagement operation chart of FIG. 2, and the stepless speed ratio width can be obtained for each gear. Consequently, a steplessly continuously variable speed ratio is obtained between the individual gears, and the total speed ratio γT as the entire drive device 10 can be steplessly obtained. The speed ratio of the differential portion 16 is controlled so as to be constant, the clutches C and the brakes B are selectively engaged, any of the first to fourth gears or the reverse gear is selectively established, and the total speed ratio γT of the drive device 10 that changes at a substantially equal rate can be obtained for each gear. Consequently, the state equal to that of the stepped transmission is attained in the drive device 10. For example, the speed ratio γ0 of the differential portion 16 is controlled to be fixed to "1", as shown in the engagement operation chart of FIG. 2, the total speed ratio γT of the drive device 10 corresponding to each of the first to fourth gears and the reverse gear of the automatic transmission 20 can be obtained for each gear. When the speed ratio γ0 of the differential portion 16 is controlled to be fixed to a value smaller than "1" such as, e.g., about "0.7" at the third gear of the automatic transmission 20, the total speed ratio γT of a value smaller than that of the third gear such as, e.g., about "0.7" is obtained.

Figure 3:
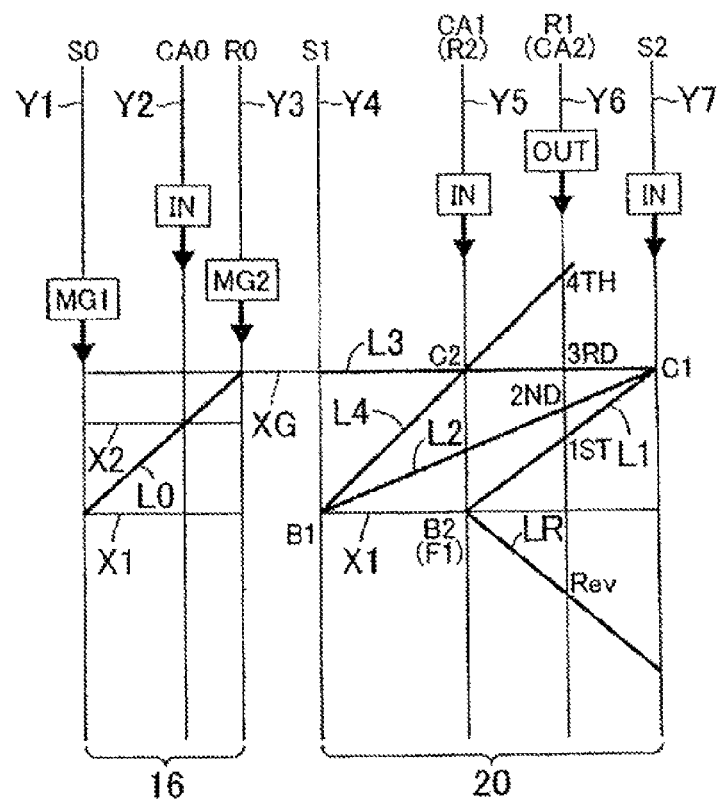
FIG. 3 is a collinear diagram that can collinearly show the relative relationship among the rotational speeds of individual rotary elements having different connection states at each gear in the drive device of FIG. 1.

FIG. 3 is a collinear diagram that can collinearly show the relative relationship among the rotation speeds of the individual rotary elements having different connection states at each gear in the drive device 10 composed of the differential portion 16 and the automatic transmission 20. The collinear diagram of FIG. 3 has two-dimensional coordinates having the horizontal axis indicative of the relationship among gear ratios ρ of the individual planetary gear sets 26, 28, and 30 and the vertical axis indicative of the relative rotation speed in which a horizontal line X1 denotes a rotation speed of zero, a horizontal line X2 denotes a rotation speed of "1.0", i.e., a rotation speed $N_E$ of the engine 24 connected to the input shaft 14, and a horizontal line XG denotes the rotation speed $N_{18}$ of the transmitting member 18.

Three vertical lines Y1, Y2, and Y3 that correspond to three elements of the power distribution device 26 constituting the differential portion 16 respectively indicate, from the left side, the relative rotation speeds of the sun gear S0 corresponding to the first rotary element, the carrier CA0 corresponding to the second rotary element, and the ring gear R0 corresponding to the third rotary element, and intervals between them are determined according to the gear ratio of the planetary gear set constituting the power distribution device 26. Four vertical lines Y4, Y5, Y6, and Y7 of the automatic transmission 20 respectively indicate, from the left side, the relative rotation speed of the sun gear S1, the relative rotation speed of the carrier CA1 and the ring gear R2 that are connected to each other, the relative rotation speed of the ring gear R1 and the carrier CA2 that are connected to each other, and the relative rotation speed of the sun gear S2, and intervals between the vertical lines Y4 to Y7 are determined according to the gear ratios of the planetary gear sets 28 and 30.

According to the collinear diagram of FIG. 3, the drive device 10 of the present embodiment is configured such that, in the power distribution device 26 (the differential portion 16), the second rotary element (the carrier CA0) of the power distribution device 26 is connected to the input shaft 14, i.e., the engine 24, the first rotary element (the sun gear S0) is connected to the first motor MG1, the third rotary element (the ring gear R0) is connected to the transmitting member 18 and the second motor MG2, and the rotation of the input shaft 14 is transmitted (inputted) to the automatic transmission 20 via the transmitting member 18. At this point, an oblique line L0 passing through an intersection point of Y2 and X2 shows the relationship between the rotation speed of the sun gear S0 and the rotation speed of the ring gear R0.

For example, in the differential portion 16, the differential state where the first to third rotary elements of the power distribution device 26 are rotatable relative to each other is established. In the case where the rotation speed of the ring gear R0 indicated by an intersection point of the line L0 and the vertical line Y3 is substantially constant due to a vehicle speed V, when fee rotation speed of the carrier CA0 indicated by an intersection point of the line L0 and the vertical line Y2 is increased or decreased by controlling the engine rotation speed $N_E$, the rotation speed of the sun gear S0 indicated by an intersection point of the line L0 and the vertical line Y1, i.e., the rotation speed of the first motor MG1 is increased or decreased.

When the rotation speed of the sun gear S0 is made equal to the engine rotation speed $N_E$ by controlling the rotation speed of the first motor MG1 such that the speed ratio γ0 of the differential portion 16 is fixed to "1", the line L0 is caused to match the horizontal line X2, and the ring gear R0, i.e., the transmitting member 18 is rotated at the same rotation speed as the engine rotation speed $N_E$. Alternatively, when the rotation speed of the sun gear S0 is reduced to zero by controlling the rotation speed of the first motor MG1 such that the speed ratio γ0 of the differential portion 16 is fixed to a value smaller than "1" such as, e.g., about 0.7, the transmitting member 18 is rotated at the rotation speed $N_{18}$ that is higher than the engine rotation speed $N_E$.

In the automatic transmission 20, the sun gear S1 as the fourth rotary element is selectively connected to the case 12 via the first brake B1. The carrier CA1 and the ring gear R2 as the fifth rotary element that are connected to each other are selectively connected to the transmitting member 18 via the second clutch C2, and are selectively connected to the case 12 via the second brake B2 (the one-way clutch F1). The ring gear R1 and the carrier CA2 as the sixth rotary element that are connected to each other are connected to the output shaft 22. The sun gear S2 as the seventh rotary element is selectively connected to the transmitting member 18 via the first clutch C1.

In the automatic transmission 20, as shown in FIG. 3, by engaging the first clutch C1 and the second brake B2 (the one-way clutch F1), the rotation speed of the output shaft 22 at the first gear (1st) is indicated by an intersection point of an oblique line L1 passing through an intersection point of the vertical line Y7 indicative of the rotation speed of the seventh rotary element and the horizontal line XG and an intersection point of the vertical line Y5 indicative of the rotation speed of the fifth rotary element and the horizontal line X1 and the vertical line Y6 indicative of the rotation speed of the sixth rotary element connected to the output shaft 22. Similarly, the rotation speed of the output shaft 22 at the second gear (2nd) is indicated by an intersection point of an oblique line 12 determined by the engagement of each of the first clutch C1 and the first brake B1 and the vertical line Y6 indicative of the rotation speed of the sixth rotary element connected to the output shaft 22. The rotation speed of the output shaft 22 at the third gear (3rd) is indicated by an intersection point of a horizontal line L3 determined by the engagement of each of the first clutch C1 and the second clutch C2 and the vertical line Y6 indicative of the rotation speed of the sixth rotary element connected to the output shaft 22. The rotation speed of the output shaft 22 at the fourth gear (4th) is indicated by an intersection point of an oblique line L4 determined by the engagement of each of the second clutch C2 and the first brake B1 and the vertical line Y6 indicative of the rotation speed of the sixth rotary element connected to the output shaft 22.

Figure 4:
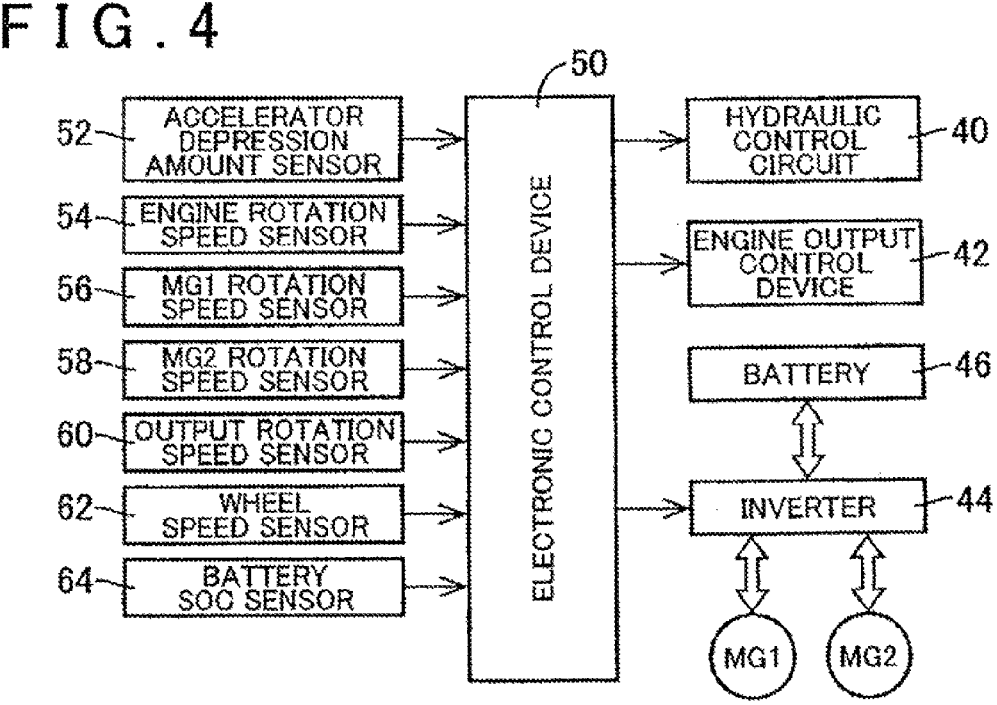
FIG. 4 is a view for explaining principal portions of a control system provided in the drive device in order to control the drive of the drive device of FIG. 1.

FIG. 4 is a view for explaining principal portions of a control system provided in the drive device 10 in order to control the drive of the drive device 10. The electronic control device 50 shown in FIG. 4 includes a central processing unit (CPU), a read only memory (ROM), a random access memory (RAM), and an input/output interface, is a so-called microcomputer that executes signal processing in accordance with programs stored in the ROM white utilizing the temporary storage function of the RAM, and executes various control operations related to the drive of the drive device 10 such as drive control of the engine 24 and hybrid drive control related to the first and second motors MG1 and MG2. This electronic control device 50 is configured as an individual control device for each control on an as needed basis such as a control device for output control of the engine 24, a control device for operation control of the first and second motors MG1 and MG2, or a control device for shift control of the automatic transmission 20.

As shows in FIG. 4, to the electronic control device 50, various signals are supplied from sensors and switches provided in the individual portions of the drive device 10. That is, mere are supplied, to the electronic control device 50, a signal indicative of an accelerator depression amount Acc as an operation amount of an accelerator pedal (not shown) corresponding to an output request amount of a driver from an accelerator depression amount sensor 52, a signal indicative of the engine rotation speed $N_E$ as the rotation speed of the engine 24 from an engine rotation speed sensor 54, a signal indicative of a rotation speed $N_{MG1}$ of the first motor MG1 from an MG1 rotation speed sensor 56, a signal indicative of a rotation speed $N_{MG2}$ of the second motor MG2 from an MG2 rotation speed sensor 58, a signal indicative of the rotation speed $N_{OUT}$ of the output shaft 22 corresponding to the vehicle speed V from the output rotation speed sensor 60, a signal indicative of a speed $N_W$ of each wheel is the drive device 10 from a wheel speed sensor 62, and a signal indicative of a charging capacity state of charge (SOC) of a battery 46 from a battery SOC sensor 64.

From the electronic control device 50, operation instructions are outputted to the individual portions of the drive device 10. That is, as engine output control instructions for controlling the output of the engine 24, a fuel injection amount signal for controlling the fuel supply amount to an intake pipe or the like by a fuel injection device, an ignition signal for instructing an ignition time (ignition timing) of the engine 24 by an ignition device, and an electronic throttle valve drive signal supplied to a throttle actuator for operating a throttle valve opening degree $θ_{TH}$ of an electronic throttle valve are outputted to an engine output control device 42 that controls the output of the engine 24.

From the electronic control device 50, an instruction signal for instructing the operation of the first and second motors MG1 and MG2 is outputted to an inverter 44, electric energy corresponding to the instruction signal is supplied to each of the first and second motors MG1 and MG2 from the battery 46 via the inverter 44, and the output (torque) of each of the first and second motors MG1 and MG2 is controlled. Electric energy generated by the first and second motors MG1 and MG2 is supplied to the battery 46 via the inverter 44, and is stored in the battery 46.

From the electronic control device 50, a hydraulic instruction for performing shift control of the automatic transmission 20 is outputted to the hydraulic control circuit 40. Specifically, when the shift of the automatic transmission 20 is determined by the electronic control device 50, a hydraulic instruction (hydraulic instruction value) for controlling the operation (output hydraulic pressure) of an electronically controlled valve such as a linear solenoid valve or the like provided in the hydraulic control circuit 40 is outputted to the hydraulic control circuit 40. With this operation, the hydraulic pressures supplied to the hydraulic actuators associated with the individual clutches C and the individual brakes B in the automatic transmission 20 are controlled from the hydraulic control circuit 40, the clutches C and the brakes B are selectively engaged in the combinations in the engagement operation chart shows in FIG. 2, and the shift control of the automatic transmission 20 is thereby performed.

Figure 5:
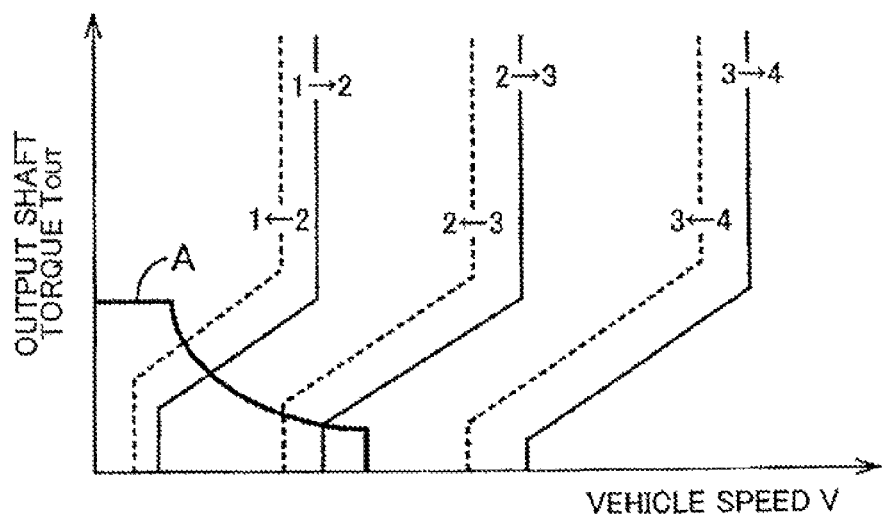
FIG. 5 is a view for explaining a shift map for performing the shift control of the automatic transmission of FIG. 1 and a drive force source map for performing the control of switching the drive force source.

FIG. 5 is a view for explaining a shift map for performing the shift control of the automatic transmission 20 and a drive force source snap for performing the control of switching the drive force source of the drive device 10. In the drive device 10, the predetermined shift map and drive force source map shown in FIG. 5 are stored in a storage device 48 (see FIG. 6). In the shift map shown in FIG. 5, a shift line (upshift line) for determining a shift from a low gear (high speed ratio gear) to a high gear (low speed ratio gear), i.e., an upshift is represented by a solid line, while a shift line (downshift line) for determining a shift from a high gear to a low gear, i.e., a downshift is represented by a one-dot chain line. The shift map shown in FIG. 5 basically corresponds to an equal power shift. In the drive force source map shown in FIG. 5, the lower output torque side and the lower vehicle speed side of a switching line represented by a bold line A corresponds to a motor running region, while the higher output torque side and the higher vehicle speed side of the switching line corresponds to an engine running region. In the motor running region, the electronic control device 50 executes motor running in which the engine 24 is stopped and, e.g., the second motor MG2 is exclusively used as the drive force source for running. In the engine running region, the electronic control device 50 executes engine running in which the engine 24 is driven and the engine 24 is exclusively used as the drive force source for running or hybrid running in which the engine 24 and the second motor MG2 are used in combination as the drive force source for running.

Figure 6:
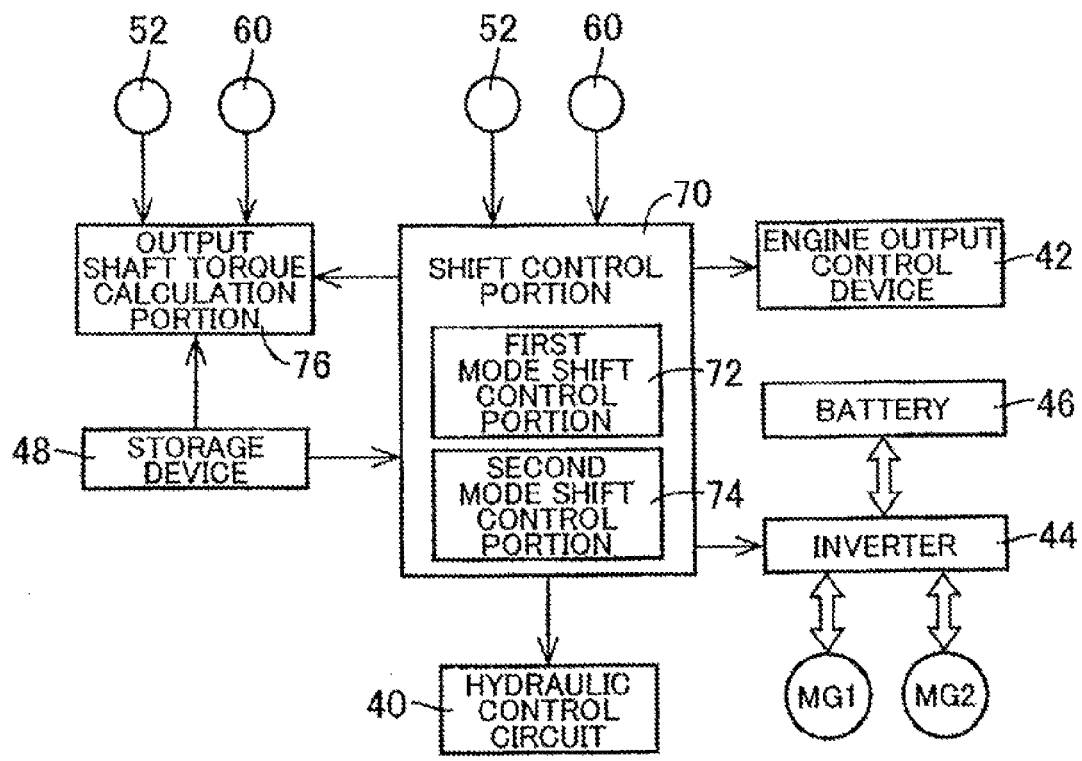
FIG. 6 is a functional block diagram for explaining principal portions of control functions provided in an electronic control device of FIG. 4.

FIG. 6 is a functional block diagram for explaining principal portions of the control functions provided in the electronic control device 50. In the present embodiment, although a description is given of an aspect in which various control functions shown in FIG. 6 are collectively provided in the electronic control device 50, the control functions may be discretely provided in, e.g., the electronic control device for engine control, the electronic control device for motor control, and the electronic control device for automatic transmission control, and various functions described below in detail may be achieved through mutual communications among the electronic control devices.

A shift control portion 70 shown in FIG. 6 performs shift control in the drive device 10. That is, the shift control portion 70 controls the shift by the differential portion 16 as the electric continuously variable transmission and the automatic transmission 20 as the stepped transmission. Herein, the shift control portion 70 may be divided into a continuously variable shift control portion that performs the shift control of the differential portion 16 and a stepped shift control portion that performs the shift control of the automatic transmission 20, but a description is given on the assumption that these control portions are not distinguished from each other in the present embodiment.

The shift control portion 70 performs, on the differential portion 16 as the electric continuously variable transmission, continuously variable shift control in which the speed ratio of the differential portion 16 is steplessly changed by controlling the operations of the first and second motors MG1 and MG2 in accordance with the running state of the vehicle such as, e.g., the vehicle speed V and the accelerator pedal operation amount Acc based on a predetermined relationship. The shift control portion 70 performs, on the automatic transmission 20 as the stepped transmission, stepped shift control in which it is determined whether or not there is any gear that can be established in the automatic transmission 20 based on the running state such as, e.g., the vehicle speed V and the accelerator pedal operation amount Acc from the shift map shown in FIG. 5 or the like, and one of, e.g., the first to fourth gears is selectively established in the automatic transmission 20 by controlling the hydraulic pressure supplied to each of the clutches C and the brakes B from the hydraulic control circuit 40 in accordance with the determination result.

As shown in FIG. 6, the shift control portion 70 includes a first mode shift control portion 72 and a second mode shift control portion 74. By the first mode shift control portion 72 and the second mode shift control portion 74, with regard to the stepped shift control in the automatic transmission 20, at least two types of shift controls having different modes are selectively executed. For example, as the first mode, the shift control based on disengagement control of the disengagement-side engagement device and engagement control of the engagement-side engagement device is executed by the first mode shift control portion 72 and, as the second mode, the shift control based on the rotation synchronization control using the drive force source torque is executed by the second mode shift control portion 74. Hereinbelow, these shift controls are described in detail.

The first mode shift control portion 72 performs the shift control in the mode in which the shift is carried out by gradually reducing the engagement pressure of the disengagement-side engagement device in the target shift, i.e., the engagement device to be disengaged in the target shift. Herein, the engagement device to be disengaged in the target shift denotes the engagement device that is disengaged (switched from the engaged state to the disengaged state) in order to establish the gear after the shift, and corresponds to, e.g., the first brake B1 in the downshift from the fourth gear to the third gear, the second clutch C2 in the downshift from the third gear to the second gear, and the first brake B1 in the downshift from the second gear to the first gear. As shown in FIG. 2, in the shift in the automatic transmission 20, a so-called clutch-to-clutch shift by disengagement of the disengagement-side engagement device and engagement of the engagement-side engagement device is performed. In the clutch-to-clutch shift, the first mode shift control portion 72 carries out the shift by taking a predetermined time to gradually reduce (lower at a relatively gentle gradient) the engagement pressure of the disengagement-side engagement device instead of quickly reducing the engagement pressure thereof to, e.g., zero. In other words, the first mode shift control portion 72 performs the shift control in the mode in which the rotation speed of the element related to the shift of the automatic transmission 20 is controlled by controlling the engagement pressure of the disengagement-side engagement device in the target shift. In the shift control in the first mode, a time required for the shift is longer than the time in the shift control in the second mode, but it is less likely to cause a shift shock. Consequently, the shift control in the first mode is the shift control placing emphasis on the shock (emphasis on shift shock suppression). That is, in the present embodiment, the shift control in the first mode corresponds to the clutch-to-clutch shift in which the shift is carried oat by gradually reducing the engagement pressure of the engagement device to be disengaged in the shift.

The second mode shift control portion 74 performs the shift control in the mode in which the shift is carried out by changing the rotation speed of the drive force source. The shift control is performed by controlling the rotation speed $N_{MG2}$ of the second motor MG2 as the drive force source. For example, the second mode shift control portion 74 performs the rotation speed synchronization control, i.e., the rotation synchronization shift in which the shift is carried out by controlling the rotation speed of the transmitting member 18 (the input rotation member of the automatic transmission 20) by the torque control of the second motor MG2 after quickly (at least more quickly than in the first mode) reducing (draining) the engagement pressure of the disengagement-side engagement device in the target shift to zero or bringing the engagement pressure thereof into a predetermined low-pressure state (low-pressure waiting). In other words, the second mode shift control portion 74 performs the shift control in the mode in which the rotation speed of the element related to the shift of the automatic transmission 20 is controlled by the torque control of the second motor MG2 or the like as the drive force source after the engagement pressure of the disengagement-side engagement device in the target shift is reduced to a predetermined value (e.g., zero). In the shift control in the second mode, although the time required for the shift is shorter than that in the shift control in the first mode, the drive torque is temporarily reduced in a driven state, and hence the shift control in the second mode is more likely to cause the shift shock than the shift control in the first mode. Consequently, the shift control in the second mode is the shift control placing emphasis on the shift speed (emphasis on shift response). That is, in the present embodiment, the shift control in the second mode corresponds to the rotation synchronization shift in which the engagement pressure of the engagement device to be disengaged in the shift is reduced more quickly than in the clutch-to-clutch shift (the shift in the first mode).

In other words, the shift control in the second mode executed by the second mode shift control portion 74 has a shift mode in which the shift is carried out by reducing the engagement pressure of the engagement device to be disengaged in the shift more quickly than in the shift control in the first mode and changing the rotation speed of the second motor MG2 or the like. The shift control in the second mode has the shift mode in which the shift is carried out by reducing the engaging torque of the engagement device to be disengaged in the shift to zero at the time of output of the shift and changing the rotation speed of the second motor MG2 or the like. The shift control in the second mode has the shift mode in which the shift is carried out by reducing the engaging torque of the engagement device to be disengaged in the shift as quickly as possible and changing the rotation speed of the second motor MG2 or the like.

In other words, the shift control in the first mode executed by the first mode shift control portion 72 has the shift mode in which she shift is carried out in a state where any of the disengagement-side engagement device and the engagement-side engagement device is engaged (or half-engaged) during a period from the start to the end of the shift, while the shift control in the second mode executed by the second mode shift control portion 74 has the shift mode in which a period when both of the disengagement-side engagement device and the engagement-side engagement device are disengaged is present during the period front the start to the end of the shift. The shift control in the first mode executed by the first mode shift control portion 72 has the shift mode in which the rotation speed related to the shift is increased by the engaging torque of the engagement device to be engaged in the shift, while the shift control in the second mode executed by the second mode shift control portion 74 has the shift mode in which the ratio of the increase in the rotation speed related to the shift by the engaging torque of the engagement device to he engaged in the shift (the ratio to the entire increase amount of the rotation speed) is smaller than that in the shift control in the first mode.

An output shaft torque calculation portion 76 shown in FIG. 6 calculates a torque $T_{OUT}$ of the output shaft 22 of the automatic transmission 20. For example, from a predetermined relationship, the torque $T_{OUT}$ of the output shaft 22 corresponding to the output torque of the automatic transmission 20 is calculated based on a torque $T_E$ of the engine 24, a torque $T_{MG1}$ of the first motor MG1, a torque $T_{MG2}$ of the second motor MG2, and the speed ratio γ of the gear established in the automatic transmission 20. The torque $T_{OUT}$ of the output shaft 22 corresponds to a target output shaft torque (an output shaft torque target value) of the drive device 10, and hence the output shaft torque calculation portion 76 may detect (calculate) the torque target value as the torque of the output shaft 22 of the automatic transmission 20. The output shaft torque target value is calculated based on the accelerator depression amount Acc detected by the accelerator depression amount sensor 32 and the output rotation speed (the vehicle speed V) detected by the output rotation speed sensor 60 from a predetermined relationship. In the configuration in which a torque sensor is provided in correspondence to the output shaft 22, the torque $T_{OUT}$ of the output shaft 22 of the automatic transmission 20 may be detected by the torque sensor.

In the power-on downshift of she automatic transmission 20, i.e., in the downshift of the automatic transmission 20 in a state where the accelerator pedal (not shown) is depressed, the shift control portion 70 selectively executes one of the shift control in the first mode by the first mode shift control portion 72 and the shift control in the second mode by the second mode shift control portion 74. Specifically, on the basis of the output shaft torque $T_{OUT}$ of the automatic transmission 20 calculated by the output shaft torque calculation portion 76, the shift control portion 70 selects one of the shift control in the first mode by the first mode shift control portion 72 and the shift control in the second mode by the second mode shift control portion 74, and executes the power-on downshift of the automatic transmission 20 by weans of the shift control in the selected mode.

When the output shaft torque Toot of the automatic transmission 20 calculated by the output shaft torque calculation portion 76 is not less than a predetermined threshold $T_{bo}$, the shift control portion 70 selects the shift control in the first mode by the first mode shift control portion 72, i.e., the shift control in the mode in which the shift is carried out by gradually reducing the engagement pressure of the disengagement-side engagement device in the target shift. When the output shaft torque $T_{OUT}$ of the automatic transmission 20 calculated by the output shaft torque calculation portion 76 is less than die predetermined threshold $T_{bo}$, the shift control portion 70 selects the shift control in the second mode by the second mode shift control portion 74, i.e., the shift control in the mode in which the shift is carried out by changing fee rotation speed of the second motor MG2 or the like as the drive force source. This selection is made based on the output shaft torque $T_{OUT}$ at the time point of determination or output of the target shift (preferably at the time point of output of the shift). Herein, the output shaft torque $T_{OUT}$ of the automatic transmission 20 is uniquely determined in correspondence to the input shaft torque (the torque of the transmitting member 18 as the input rotation member) $T_{IN}$ of the automatic transmission 20, and hence the threshold $T_{bo}$ serving as the reference of the selection may be predetermined in correspondence to the input shaft torque $T_{IN}$ of the automatic transmission 20. That is, the shift control portion 70 may select one of the shift control in the first mode by the first mode shift control portion 72 and the shift control in the second mode by the second mode shift control portion 74 based on the input shaft torque $T_{IN}$ of the automatic transmission 20.

Figure 7:
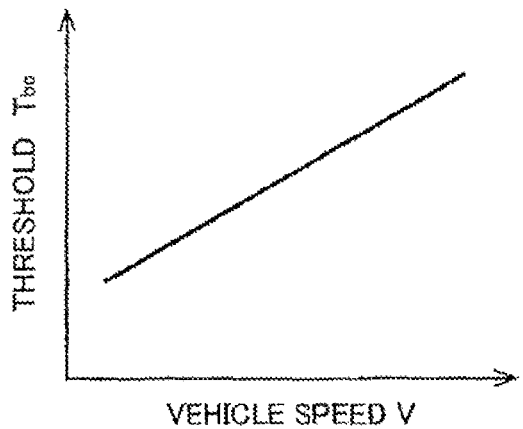
FIG. 7 is a view showing an example of the correspondence between a vehicle speed and a threshold serving as a reference of selection that is used for the control of the present embodiment by the electronic control device of FIG. 4.

The shift control portion 70 may change the threshold $T_{bo}$ serving as the reference of the selection based on at least one of the vehicle speed V, the accelerator depression amount Acc, and the gear established in the automatic transmission 20 (the gear before the shift is started). FIG. 7 is a view showing an example of the correspondence between the vehicle speed V and the threshold $T_{bo}$ as the reference of the selection. In the example shown in FIG. 7, the threshold $T_{bo}$ as the reference of the selection becomes larger as the vehicle speed V is higher (as the vehicle speed is higher). That is, the shift control portion 70 may set the threshold $T_{bo}$ as the reference of the selection to a larger value as the vehicle speed V is higher. In the case where the vehicle speed V is relatively high (the vehicle speed is high), the drive force change amount between the value before the shift and the value after the shift is large as compared with the case where the vehicle speed V is relatively low (the vehicle speed is low), a shock due to a torque reduction is canceled out by a larger shock resulting from the large drive force change amount, and the sensitivity of a driver to the shock in the shift is thereby lowered. Consequently, by enlarging a region where the shift control in the second mode is performed as the vehicle speed is higher, if is possible to execute the shift control that places emphasis on the shift response while suppressing the shock to the driver caused by the shift as much as possible.

Figure 8:
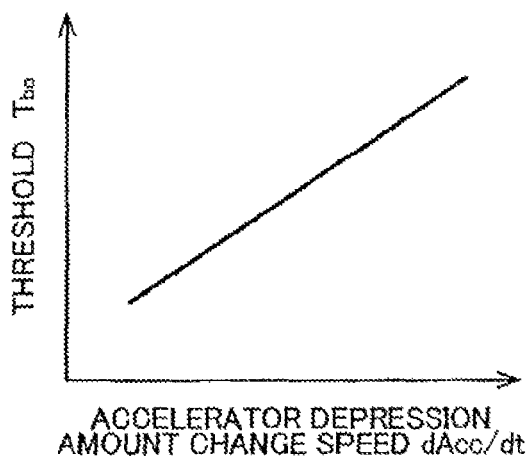
FIG. 8 is a view showing an example of the correspondence between the temporal change rate of an accelerator depression amount and the threshold serving as the reference of the selection that is used for the control of the present embodiment by the electronic control device of FIG. 4.

FIG. 8 is a view showing an example of the correspondence between a temporal change rate dAcc/dt of the accelerator depression amount Acc and the threshold $T_{bo}$ as the reference of the selection. In the example shown in FIG. 8, the threshold $T_{bo}$ as the reference of the selection becomes larger as the temporal change rate dAcc/dt of the accelerator depression amount Acc is larger (e.g., as the accelerator pedal depression speed is higher). That is, the shift control portion 70 may set the threshold $T_{bo}$ as the reference of the selection to a larger value as the temporal change rate dAcc/dt of the accelerator depression amount Acc is larger. In the case where the temporal change rate dAcc/dt of the accelerator depression amount Acc is relatively large (the accelerator pedal depression speed is high), the drive force change amount between the value before the shift and the value after the shift is large as compared with tire case where the temporal change rate dAcc/dt is relatively small (the accelerator pedal depression speed is low), the shock due to the torque reduction is canceled out by the larger shock resulting from the large drive force change amount, and the sensitivity of the driver to the shock in the shift is thereby lowered. Consequently, by enlarging the region where the shift control in the second mode is performed as the temporal change rate dAcc/dt of the accelerator depression amount Acc is larger, it is possible to execute the shift control that places emphasis on the shift response while suppressing the shock to the driver caused by the shift as much as possible.

Figure 9:
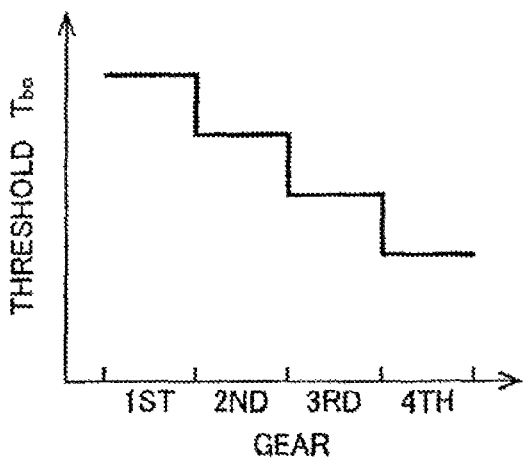
FIG. 9 is a view showing an example of the correspondence between a gear of the automatic transmission and the threshold serving as the reference of the selection that is used for the control of the present embodiment by the electronic control device of FIG. 4.

FIG. 9 is a view showing an example of the correspondence between the gear established in the automatic transmission 20 (the gear before the shift is started) and the threshold $T_{bo}$ as the reference of the selection. In the example shown in FIG. 9, the threshold $T_{bo}$ as the reference of the selection becomes larger as the gear established in the automatic transmission 20 is a lower gear (as the speed ratio γ of the gear is larger). That is, the shift control portion 70 may set the threshold $T_{bo}$ as the reference of the selection to a larger value as the gear established in the automatic transmission 20 is a lower gear. In the case where the gear established in the automatic transmission 20 is a low gear (the speed ratio γ is relatively large), the drive force change amount between the value before the shift and the value after the shift is large as compared with the case where the gear is a high gear (the speed ratio γ is relatively small), the shock due to the torque reduction is canceled out by the larger shock resulting from the large drive force change amount, and the sensitivity of the driver to the shock is thereby lowered. Consequently, by enlarging the region where the shift control in the second mode is performed as the gear established in the automatic transmission 20 is a lower gear, it is possible to execute the shift control that places emphasis on the shift response while suppressing the shock to the driver caused by the shift as much as possible.

Herein, the above-described correspondences shown in FIGS. 7 to 9 can be used in a mutually complex manner. That is, the correspondence that the threshold $T_{bo}$ becomes larger as the vehicle speed V is higher, the threshold $T_{bo}$ becomes larger as the temporal change rate dAcc/dt of the accelerator depression amount Ace is larger, and the threshold $T_{bo}$ becomes larger as the gear established in the automatic transmission 20 is a lower gear is predetermined, and the change (setting) of the threshold $T_{bo}$ by the shift control portion 70 may be performed based on the correspondence.

In the case where the power-on downshift is a multiple shift, when the shift control in the second mode by the second mode shift control portion 74 is selected in a prior shift (among a plurality of shifts in the multiple shift, a shift of which determination and output are performed prior to those of the other shifts), the shift control portion 70 selects the shift control in the second mode by the second mode shift control portion 74 also m a subsequent shift (among a plurality of shifts in the multiple shift, a shift of which determination and output are performed subsequent to those of the other shifts). That is, when the shift control in the mode in which the shift is carried out by changing the rotation speed of the second motor MG2 or the like as the drive force source is selected in the prior shift, the shift control in the same mode is selected in the subsequent shift. The multiple shift mentioned herein denotes a case where the second shift (the subsequent shift) is determined and outputted while the first shift (the prior shift) is carried out in the automatic transmission 20 and, for example, a case where the downshift from the second gear to the first gear is determined during the downshift from the third gear to the second gear and these shifts are continuously performed corresponds to this case.

In the case where the power-on downshift is the multiple shift, when the shift control in the first mode by the first mode shift control portion 72 is selected in the prior shift, the shift control portion 70 selects one of the shift control in the first mode by the first mode shift control portion 72 and the shift control in the second mode by the second mode shift control portion 74 in the subsequent shift based on the output shaft torque $T_{OUT}$ of the automatic transmission 20 calculated by the output shaft torque calculation portion 76. For example, at the time point of determination or output of the subsequent shift, when the output shaft torque $T_{OUT}$ of the automatic transmission 20 calculated by the output shaft torque calculation portion 76 is not less than a predetermined threshold $T_{bo}$, the shift control in the first mode by the first mode shift control portion 72, i.e., the shift control in the mode in which the shift is carried out by gradually reducing the engagement pressure of the disengagement-side engagement device in the target shift is selected for the subsequent shift. At the time point of determination or output of the subsequent shift, when the output shaft torque $T_{OUT}$ of the automatic transmission 20 calculated by the output shaft torque calculation portion 76 is less than the predetermined threshold $T_{bo}$, the shift control in the second mode by the second mode shift control portion 74, i.e., the shift control in the mode in which the shift is carried out by changing the rotation speed of the second motor MG2 or the like as the drive force source is selected for the subsequent shift. With regard to the multiple shift, is the case of the shift pattern in which the subsequent shift cannot be outputted during the inertia phase of the prior shift, the subsequent shift is outputted at the time point of completion of the prior shift. Accordingly, the mode of the shift control may appropriately selected based on the output shaft torque $T_{OUT}$ at the time point of output of the subsequent shift.

In the case where the power-on downshift is performed in the second mode by the second mode shift control portion 74, when the engagement-side engagement device, i.e., the engagement device to be engaged in the shift is the engagement device that can be engaged without hydraulic control such as the one-way clutch F1, the shift control portion 70 performs control in which the rotation speed of the input rotation member (the transmitting member 18) is temporarily reduced to be lower than the synchronization rotation speed at the time of completion of the rotation speed synchronization control by the second mode shift control portion 74. For example, the shift control portion 70 performs control m which a target input rotation speed $N_{IN}*$ is set to a value smaller than that of a synchronization rotation speed $N_{sp}$. On the other hand, when the engagement-side engagement device in the power-on downshift is the engagement device that needs the hydraulic control (is engaged by an increase in engagement pressure) such as the clutches C and the brakes B, the shift control portico 70 performs control in which the rotation speed of the input rotation member (the transmitting member 18) is temporarily increased to be higher than the synchronization rotation speed at the time of completion of the rotation speed synchronization control by the second mode shift control portion 74. For example, the shift control portion 70 performs control in which the target input rotation speed $N_{IN}*$ is set to a value larger than that of the synchronization rotation speed $N_{sp}$.

Figure 10:
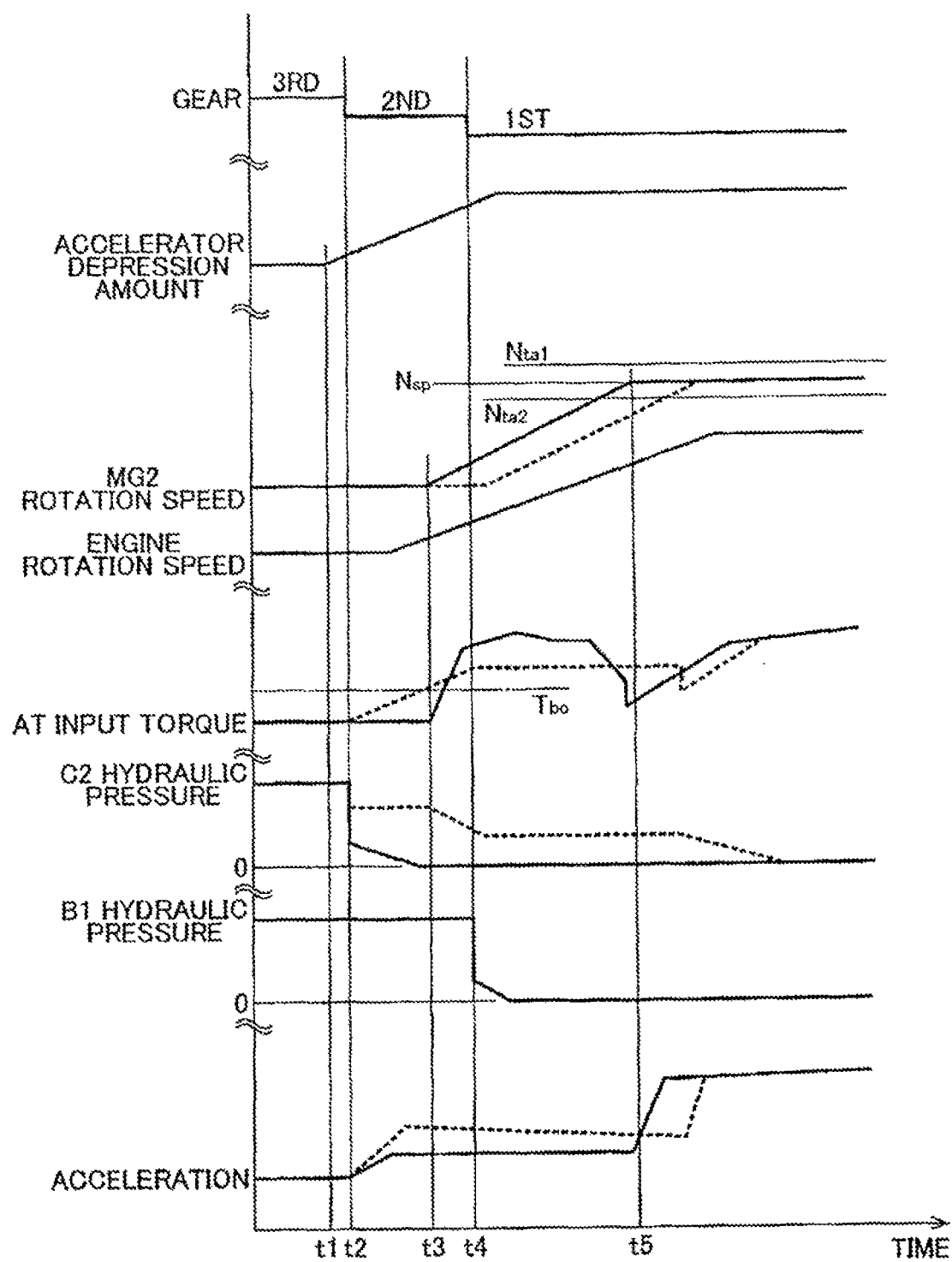
FIG. 10 is a time chart explaining the shift control of the present embodiment by the electronic control device of FIG. 4 and also showing the control by the related art.

FIG. 10 is a time chart for explaining the shift control of the present embodiment by the electronic control device 50 in which a time-varying change of each relevant value in the case where the control of the present embodiment is performed is indicated by a solid line, while a time-varying change of each relevant value in the case where conventional control is performed instead of the control of the present embodiment is indicated by a broken line. In addition, the threshold $T_{bo}$ serving as the reference of the selection of the mode of the shift control is indicated by a thin one-dot chain line. In the control shown in FIG. 10, the mode of the shift control is selected based on the input shaft torque $T_{IN}$ of the automatic transmission 20, and the threshold $T_{bo}$ is determined in correspondence to the input shaft torque $T_{IN}$.

First, at a time point t1, the accelerator pedal (not shown) is depressed and an increase in accelerator depression amount Ace is started. At the time of the depression operation of the accelerator pedal, the shift from the third gear to the second gear its the automatic transmission 20 is determined. Next, at a time point t2, the shift from the third gear to the second gear in the automatic transmission 20 is outputted. At the time point t2, it is determined whether or not the input shaft torque $T_{IN}$ of the automatic transmission 20 is not less than the threshold $T_{bo}$ indicated by the one-dot chain line. In the example shown in FIG. 10, the input shaft torque $T_{IN}$ of the automatic transmission 20 at the time point t2 is less than the threshold $T_{bo}$, and hence the shift control in the second mode, i.e., the shift control in the mode in which the shift is carried out by changing tire torque of the drive force source (the second motor MG2) (the rotation speed synchronization control) is selected. That is, after the hydraulic pressure of the second clutch C2 as the disengagement-side engagement device in the shift from the third gear to the second gear is sharply reduced from the time point t2 and quickly lowered to zero, the input shaft torque $T_{IN}$ is gradually increased by the torque control of the second motor MG2 or the like from a time point t3, and the shift from the third gear to the second gear is thereby carried cut. Herein, in the control of the present embodiment, after the hydraulic pressure of the second clutch C2 is sharply reduced form the time point t2, the torque of the drive force source (the input shaft torque $T_{IN}$) is maintained constantly without being increased for a predetermined time period from the time point t2 to the time point t3. This operation is for preventing a reduction in drivability resulting from the occurrence of a torque vibration in the drive system when the disengagement-side engagement device is disengaged, and the increase in the torque of the second motor MG2 is started from the time point t3. According to the control of the present embodiment, it can be seen that, as compared with the conventional control indicated by the broken line, the start of the inertia phase in the shift is advanced, and the shift response is improved. In a state where the input shaft torque $T_{IN}$ is less than the threshold $T_{bo}$, which is a relatively low state, a large fore-and-aft acceleration is not likely to occur even when a drain hydraulic pressure (the hydraulic pressure of the second clutch C2) is reduced at a steep gradient so that the shift shock is mild.

In the example shows in FIG. 10, during the shift from the third gear to the second gear in the automatic transmission 20, i.e., during a period from the time point t2 to the time point t3, the downshift from the second gear to the first gear is determined. As a result, at a time point t4, the shift from the second gear to the first gear in the automatic transmission 20 is outputted. At the time point t4, although the input shaft torque $T_{IN}$ of the automatic transmission 20 is not less than the threshold $T_{bo}$ indicated by the one-dot chain line, since the shift control in the second mode is performed in the shift from the third gear to the second gear as the prior shift of the multiple shift, in the control of the present embodiment, the shift control in the second mode (the rotation speed synchronization control) is continuously performed also in the downshift from the second gear to the first gear as the subsequent shift of the multiple shift. That is, the hydraulic pressure of the first brake B1 as the disengagement-side engagement device in the shift from the second gear to the first gear is sharply reduced from the time point t4 and is quickly lowered to zero. Concurrently with the hydraulic control, by the torque control of the second motor MG2 or the like, the shift is carried out. Herein, the automatic transmission 20 is already brought into the neutral state in the prior shift control, and hence the shift shock is not likely to occur even when the hydraulic pressure of the first brake B1 is reduced at a steep gradient from the time point t4.

In FIG. 10, the synchronization rotation speed after the shift of the input rotation speed $N_{IN}$ (=the rotation speed of the second motor MG2) of the automatic transmission 20 in the downshift from the second gear to the first gear is denoted by $N_{sp}$, the target rotation speed of the second motor MG2 in the case where the engagement-side engagement device in the shift is the engagement device that needs the hydraulic control such as the clutches C and the brakes B is denoted by $N_{ta1}$, and the target rotation speed of the second motor MG2 in the case where the engagement-side engagement device is the engagement device that does not need the hydraulic control such as the one-way clutch F1 is denoted by $N_{ta2}$. In the case where the engagement-side engagement device in the shift is one of the clutches C and the brakes B that need the hydraulic control, by setting the target rotation speed of the second motor MG2 to $N_{ta1}$ as the value larger than the synchronization rotation speed after the shift $N_{sp}$, it is possible to prevent the occurrence of the drive force on a pulling-back side when the engagement-side engagement device is engaged at the time of completion of the shift. In other words, since the power-on shift is performed, the deterioration of the drivability is prevented by constantly outputting a torque for driving the drive wheels. On the other hand, in the case where the engagement-side engagement device in the shift is the one-way clutch F1 that does not need the hydraulic control, by setting the target rotation speed of the second motor MG2 to $N_{ta2}$ as the value lower than the synchronization rotation speed $N_{sp}$, it is possible to prevent the occurrence of a synchronization shock. Herein, as shown in the engagement operation chart of FIG. 2, there are eases where die engagement-side engagement device in the shift from the second gear to the first gear in the automatic transmission 20 is the one-way clutch F1. In this case, the target rotation speed of the second motor MG2 at the time of completion of the shift from the second gear to the first gear is set to $N_{ta2}$ mentioned above, but FIG. 10 shows an example in which the synchronization rotation speed $T_{sp}$ at the first gear is achieved at a time point t5 for the sake of convenience.

Figure 11:
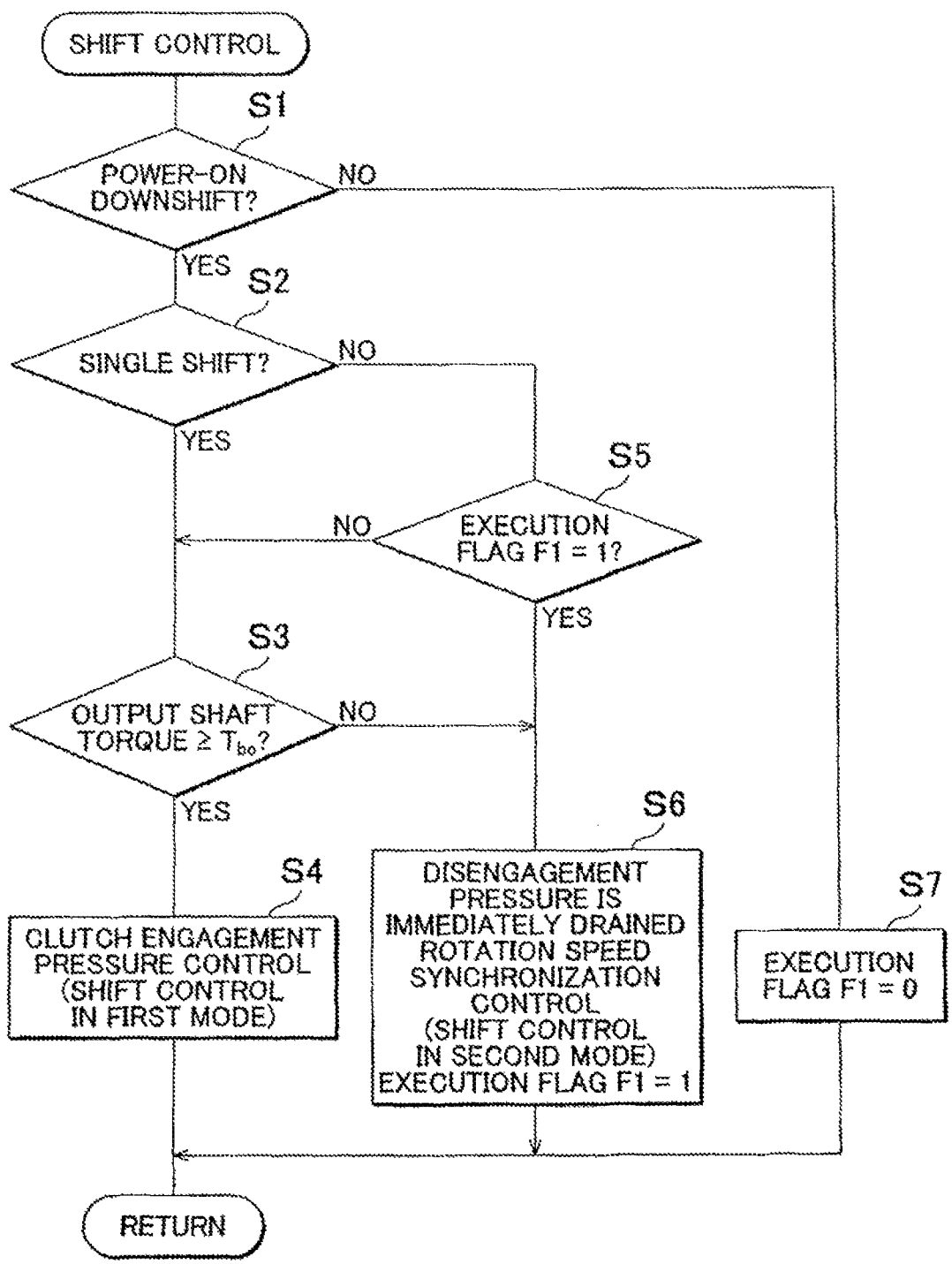
FIG. 11 is a flowchart explaining main processes of the shift control of the present embodiment by the electronic control device of FIG. 4.

FIG. 11 is a view for explaining main processes of the shift control of the automatic transmission 20 by the electronic control device 50, and the processes are repeatedly executed at predetermined intervals.

First, in Step (hereinbelow the word "Step" is omitted) S1, it is determined whether or not the power-on downshift, i.e., the downshift of the automatic transmission 20 in the state where the accelerator pedal is depressed is performed. When the determination in S1 is negative, after an execution flag F1 is set to 0 (F1=0) in S7, the present routine is ended. When the determination in S1 is positive, in S2, it is determined whether or not the shift to be executed is a single shift. When the determination in S2 is negative, i.e., when it is determined that the multiple shift is executed (when it is determined that the shift to be executed is related to the multiple shift), the processes of S5 and subsequent thereto are executed. When the determination in S2 is positive, in S3, the output shaft torque $T_{OUT}$ of the automatic transmission 20 is calculated, and it is determined whether or not the output shaft torque $T_{OUT}$ is not less than the predetermined threshold $T_{bo}$. When the determination in S3 is negative, the processes of S6 and subsequent thereto are executed. When the determination in S3 is positive, in S4, after the clutch engagement pressure control, i.e., the shift control in the first mode in which the shift is carried out by gradually reducing the engagement pressure of the disengagement-side engagement device is executed, the present routine is ended. In S5, it is determined whether or not the execution flag F1 is set to 1. When the determination in S5 is negative, the processes of S3 and subsequent thereto are executed. When the determination in S5 is positive, in S6, the hydraulic pressure of the disengagement-side engagement device is immediately drained, the rotation speed synchronization control, i.e., the shift control in the second mode in which the shift is carried out by changing the rotation speed of the drive force source is executed, the execution flag F1 is set to 1 (F1=1), and then the present routine is ended. In the control described above, S1 to S7 correspond to the operation of the shift control portion 70, S4 corresponds to the operation of the first mode shift control portion 72, S6 corresponds to the operation of the second mode shift control portion 74, and S3 corresponds to the operation of the output shaft torque calculation portion 76.

Thus, according to the present embodiment, in the downshift of the automatic transmission 20 in the state where the accelerator pedal is depressed, one of the clutch-to-clutch shift and the rotation synchronization shift is selectively executed based on the output shaft torque $T_{OUT}$ of the automatic transmission 20, the region where the rotation synchronization shift is selected is lower in output shaft torque than the region where the clutch-to-clutch shift is selected, and hence it is possible to selectively execute the shift placing emphasis on the shock or the shift placing emphasis on the shift speed in accordance with the output shaft torque $T_{OUT}$. That is, it is possible to provide the electronic control device 50 of the vehicular automatic transmission 20 that prevents the occurrence of the shock while improving the shift response.

Since the clutch-to-clutch shift is the shift in which the shift is carried out by gradually reducing the engagement pressure of the clutch C or the brake B as the engagement device to be disengaged in the shift, and the rotation synchronization shift is the shift in which the engagement pressure of the engagement device to be disengaged in the shift is reduced more quickly than in the clutch-to-clutch shift, it is possible to selectively execute one of the shift placing emphasis on the shock and the shift placing emphasis on the shift speed in accordance with the output shaft torque $T_{OUT}$.

The clutch-to-clutch shift is selected when the output shaft torque $T_{OUT}$ of the automatic transmission 20 is not less than the predetermined threshold $T_{bo}$, the rotation synchronization shift is selected when the output shaft torque $T_{OUT}$ of the automatic transmission 20 is less than the threshold $T_{bo}$, and the threshold $T_{bo}$ is changed based on at least one of the vehicle speed V, the accelerator depression amount Acc, and the gear established in the automatic transmission 20. As a result, when the output shaft torque $T_{OUT}$ is relatively large, it is possible to suppress the reduction in the drive force by performing the shift control based on the engagement pressure control of the engagement device and, when the output shaft torque $T_{OUT}$ is relatively small, it is possible to swiftly perform the shift by performing the shift control based on the rotation speed control of the drive force source. Further, it is possible to further adequately select the shift placing emphasis on the shock or the shift placing emphasis on the shift speed by changing the threshold based on the vehicle speed V, the accelerator depression amount Acc, and the gear.

In the case where the downshift is the multiple shift, when the rotation synchronization shift is selected in the prior shift, the rotation synchronization shift is selected also in the subsequent shift, and hence it is possible to further improve the shift response by quickly establishing the target gear when the engagement pressure of the disengagement-side engagement device is reduced.

In the case where the downshift is the multiple shift, when the clutch-to-clutch shift is selected in the prior shift, one of the clutch-to-clutch shift and the rotation synchronization shift is selected in the subsequent shift based on the output shaft torque $T_{OUT}$ of the automatic transmission 20, and hence it is possible to selectively execute, as the subsequent shift in the multiple shift, one of the shift placing emphasis on the shock and the shift placing emphasis on the shift speed in accordance with the output-shaft torque $T_{OUT}$.

Although the embodiment as one example of the invention has thus been described in detail based on the drawings, the invention is not limited thereto, and various modifications may be made without departing from the gist thereof.

What is claimed is:

1. A control apparatus for a vehicular automatic transmission comprising:
    a controller configured to selectively execute one of a clutch-to-clutch shift and a rotation synchronization shift based on an output shaft torque of the automatic transmission in a downshift of the automatic transmission in a state where an accelerator pedal is depressed, a region where the rotation synchronization shift is selected being lower in output shaft torque than a region where the clutch-to-clutch shift is selected, and the vehicular automatic transmission being a stepped vehicular automatic transmission that is connected to a drive force source and establishes any of a plurality of predetermined gears by selectively engaging a plurality of engagement devices.

2. The control apparatus according to claim 1, wherein the clutch-to-clutch shift is a shift in which the shift is carried out by gradually reducing an engagement pressure of the engagement device to be disengaged in the shift, and the rotation synchronization shift is a shift in which an engagement pressure of the engagement device to he disengaged in the shift is reduced more quickly than in the clutch-to-clutch shift.

3. The control apparatus according to claim 1, wherein the controller selects the clutch-to-clutch shift when the output shaft torque of the automatic transmission is not less than a predetermined threshold, selects the rotation synchronization shift when the output shaft torque of the automatic transmission is less than the threshold, and changes the threshold based on at least one of a vehicle speed, an accelerator depression amount, and a gear established in the automatic transmission.

4. The control apparatus according to claim 3, wherein the controller sets the threshold having a larger value as the vehicle speed is higher.

5. The control apparatus according to claim 3, wherein the controller sets the threshold having a larger value as a temporal change rate of the accelerator depression amount is larger.

6. The control apparatus according to claim 3, wherein the controller sets the threshold having a larger value as the gear of the automatic transmission is a lower gear.

7. The control apparatus according to claim 1, wherein in a case where the downshift is a multiple shift, when the rotation synchronization shift is selected in a prior shift, the controller selects the rotation synchronization shift also in a subsequent shift.

8. The control apparatus according to claim 1, wherein in a case where the downshift is a multiple shift, when the clutch-to-clutch shift is selected in a prior shift, the controller selects one of the clutch-to-clutch shift and the rotation synchronization shift in a subsequent shift based on the output shaft torque of the automatic transmission.

9. The control apparatus according to claim 8, wherein in the case where the downshift is the multiple shift, the controller selects the clutch-to-clutch shift in the subsequent shift when the output shaft torque of the automatic transmission is not less than a predetermined threshold, and selects the rotation synchronization shift in the subsequent shift when the output shaft torque of the automatic transmission is less than the threshold.

10. A control method for a vehicular automatic transmission, comprising:
selectively executing one of a clutch-to-clutch shift and a rotation synchronization shift based on an output shaft torque of the automatic transmission in a downshift of the automatic transmission in a state where an accelerator pedal is depressed, a region where the rotation synchronization shift is selected being lower in output shaft torque than a region where the clutch-to-clutch shift is selected, and the vehicular automatic transmission being a stepped automatic transmission that is connected to a drive force source and establishes any of a plurality of predetermined gears by selectively engaging a plurality of engagement devices.

* * * * *